(12) United States Patent
Guiet

(10) Patent No.: US 11,058,063 B2
(45) Date of Patent: Jul. 13, 2021

(54) BALE CUTTING DEVICE, IMPLEMENT AND METHOD

(71) Applicant: DEERE & COMPANY, Moline, IL (US)

(72) Inventor: Lionel Guiet, Gray (FR)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/414,841

(22) Filed: May 17, 2019

(65) Prior Publication Data

US 2019/0357443 A1 Nov. 28, 2019

(30) Foreign Application Priority Data

May 24, 2018 (DE) .......................... 102018208171.9

(51) Int. Cl.
*A01F 29/00* (2006.01)
*A01F 29/08* (2006.01)
*A01F 29/01* (2006.01)

(52) U.S. Cl.
CPC ............ *A01F 29/005* (2013.01); *A01F 29/08* (2013.01); *A01F 29/01* (2013.01)

(58) Field of Classification Search
CPC ........ A01F 29/005; A01F 29/08; A01F 29/01; A01D 2087/128; A01D 87/127; A01D 87/122; A01D 90/08
See application file for complete search history.

(56) References Cited

U.S. PATENT DOCUMENTS

| 3,979,077 A | | 9/1976 | Dalman | |
| 4,163,524 A | * | 8/1979 | Lundahl | A01D 87/121 241/101.76 |
| 4,771,670 A | | 9/1988 | Woerman | |
| 4,878,410 A | * | 11/1989 | Darnell | B26D 1/08 83/635 |
| 5,033,684 A | * | 7/1991 | von der Heide | A01F 25/2036 241/101.77 |
| 5,242,121 A | * | 9/1993 | Neier | A01D 87/127 241/101.76 |
| 5,542,326 A | * | 8/1996 | Borgford | A01D 87/127 241/605 |

(Continued)

FOREIGN PATENT DOCUMENTS

| CA | 2220627 A1 | * | 5/1999 | ........... A01F 15/005 |
| EP | 2732690 A1 | * | 5/2014 | ........... A01D 87/127 |

(Continued)

OTHER PUBLICATIONS

European Search Report issued in counterpart application No. 19175927.3 dated Aug. 21, 2019. (7 pages).

*Primary Examiner* — Jonathan G Riley

(57) ABSTRACT

An implement includes a bale cutting device, which includes a carrier that can be pivoted about a pivot axis, and a support connected to the carrier. A cutter bar is attached to and supported by the support so as to be movable at least substantially in the direction of a longitudinal extent of the support. The implement may include at least one pick-up for engaging a bale. In operation, the cutter bar is positioned on a far side of the bale, with the bale between the carrier and the cutter bar. The cutter bar may then be drawn inward into the bale to cut the bale approximately in half.

7 Claims, 7 Drawing Sheets

(56) References Cited

U.S. PATENT DOCUMENTS

| | | | | |
|---|---|---|---|---|
| 5,544,606 | A | * | 8/1996 | Schmidt, Jr. ............ B63B 27/36 |
| | | | | 114/366 |
| 5,718,157 | A | * | 2/1998 | Hawley ............... B65B 69/0025 |
| | | | | 241/605 |
| 6,301,869 | B1 | * | 10/2001 | Schmitcke .............. A01F 15/10 |
| | | | | 100/88 |
| 8,955,505 | B2 | * | 2/2015 | Jonsson ............... B23D 59/008 |
| | | | | 125/21 |
| 2008/0041989 | A1 | * | 2/2008 | Schierman ............ A01F 29/005 |
| | | | | 241/101.72 |
| 2013/0149082 | A1 | * | 6/2013 | Sheedy ................ A01D 87/127 |
| | | | | 414/412 |

FOREIGN PATENT DOCUMENTS

| | | | | |
|---|---|---|---|---|
| EP | 2732690 | A1 | | 5/2014 |
| FR | 2695292 | A1 | * | 3/1994 ......... A01F 25/2036 |
| GB | 2483988 | A | | 3/2012 |
| WO | 0040072 | A2 | | 7/2000 |
| WO | 2010016045 | A1 | | 2/2010 |

\* cited by examiner

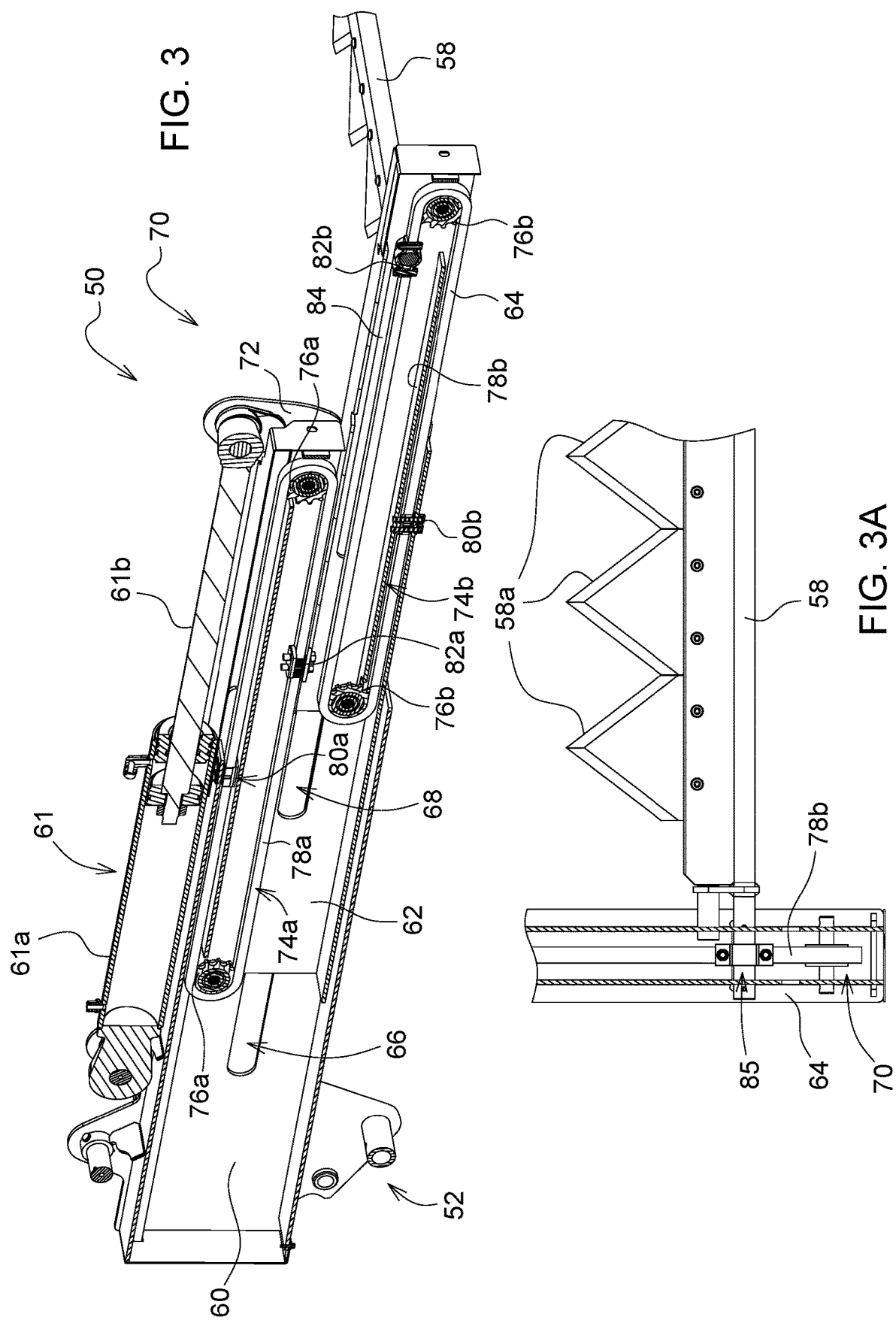

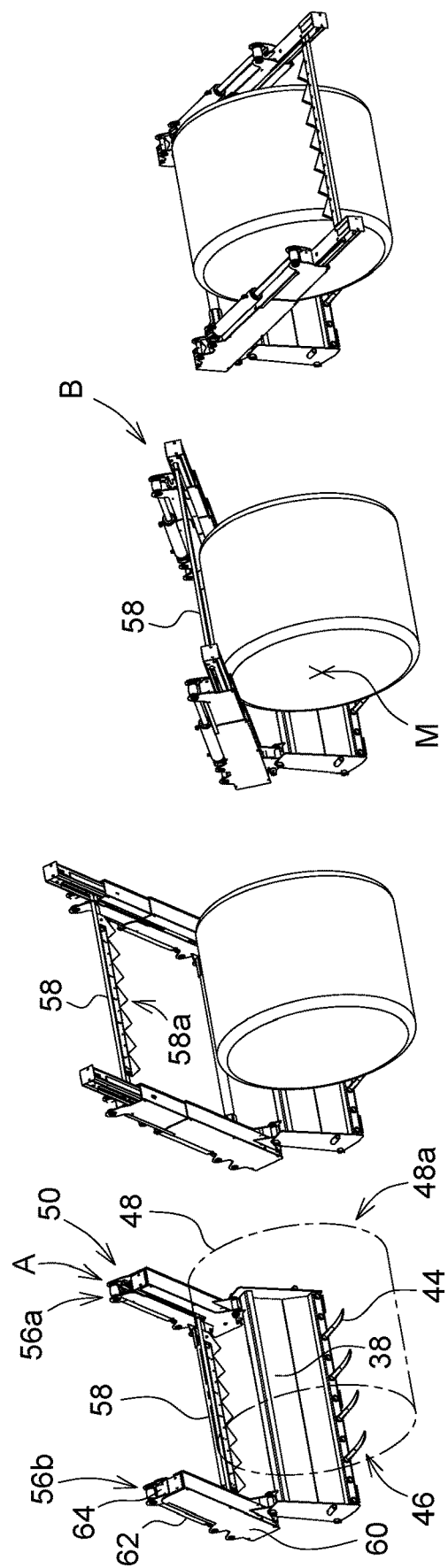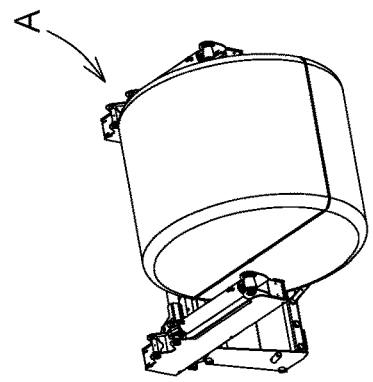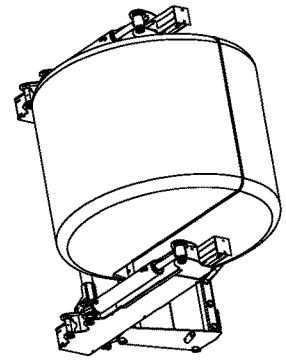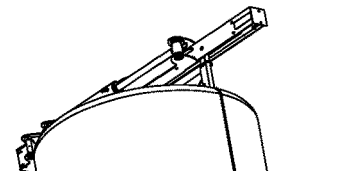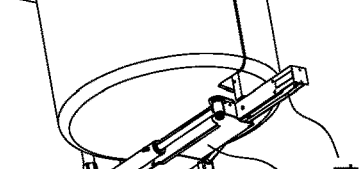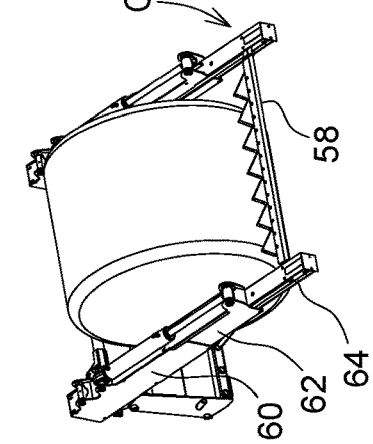

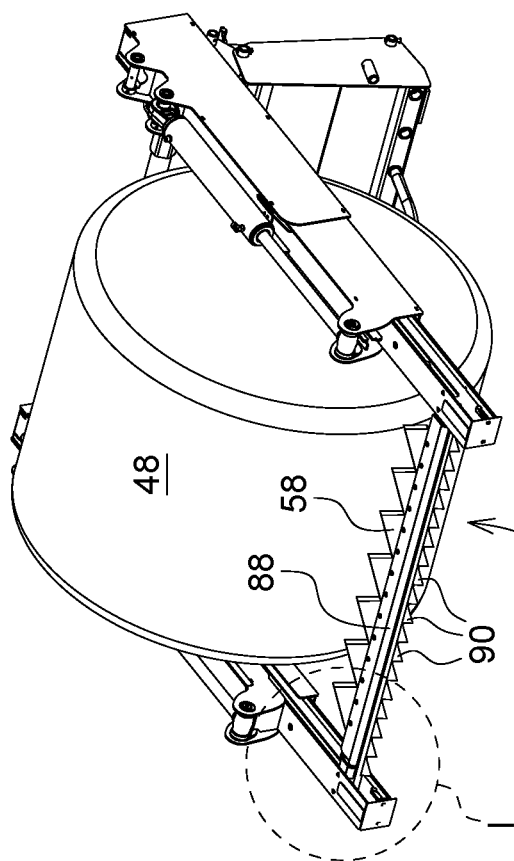
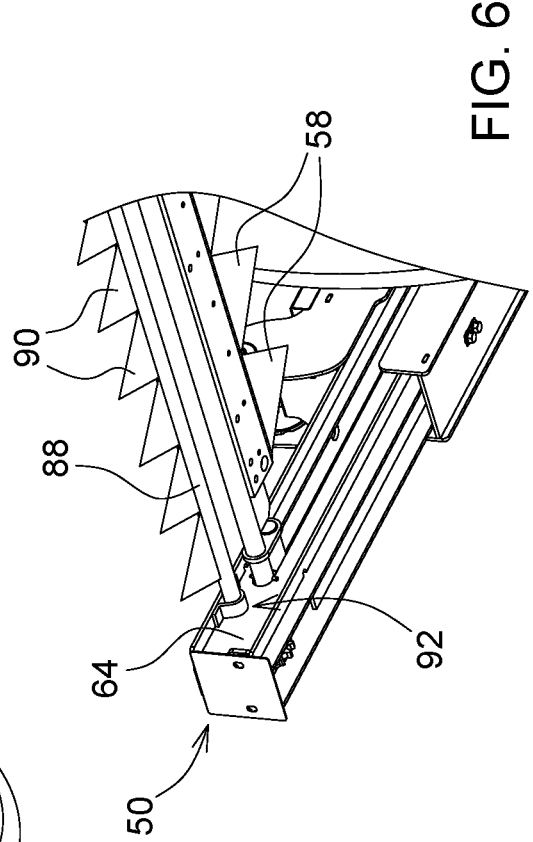
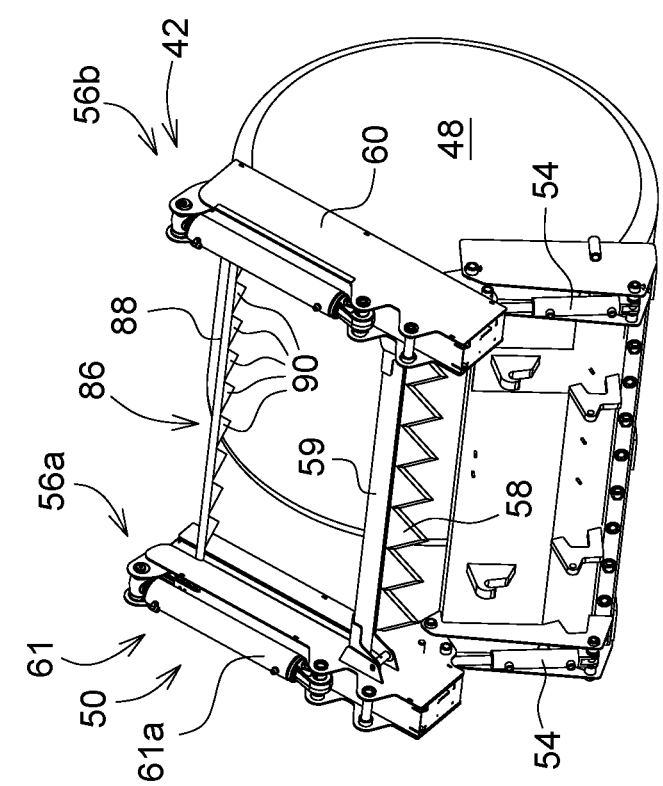
FIG. 5B
FIG. 6
FIG. 5A

BALE CUTTING DEVICE, IMPLEMENT AND METHOD

CROSS-REFERENCE TO RELATED APPLICATIONS

This application claims priority to German Patent Application No. DE 102018208171.9, filed on May 24, 2018, the disclosure of which is hereby incorporated by reference in its entirety.

TECHNICAL FIELD

The disclosure generally relates to an implement having a bale cutting device, and a method of operating the implement.

BACKGROUND

Known bale cutting devices are used to cut and/or sever bales, so that a material forming the bale becomes accessible. For this purpose, a cutter bar is usually provided, which is accommodated on a pivotable carrier and is brought by the latter to the bale and pressed into it in order to sever the bale and a wrapping material in the form of a net, film or yarn wrapping the bale if present. Such bales are, for example, industrial bales, consisting of materials such as textiles, garbage, etc., but in particular agricultural bales of hay, straw, silage or another crop. Bale cutting devices are used on industrial and/or agricultural vehicles, such as tractors, loaders, excavators, etc. Known bale cutting devices frequently require the use of a special attachment frame, are often bulky and/or make it necessary for a wrapping material to be removed manually after completion of the cutting process.

SUMMARY

An implement having a bale cutting device is provided. The implement includes a carrier pivotable about a pivot axis. At least one cutter bar is movably received on the carrier for movement in, at least substantially, the direction of a longitudinal extent of the carrier, so that a bale can be severed as completely as possible by the cutter bar. Since the cutter bar moves along the carrier, the result is a cutting edge that is as straight and/or clean as possible, as a result of which, the bale can be divided uniformly and/or a wrapping material enveloping the bale can be removed easily. It is conceivable to provide such a bale cutting device at the factory or subsequently on an implement, to retrofit an implement accordingly, or to design a bale cutting device as an interchangeable implement.

The carrier can may assume at least one position in which the cutter bar is engaged on and/or within a bale, at least substantially, opposite the pivot axis with respect to the bale or a center thereof. This can promote the introduction of force into the cutter bar and permits a pulling cut.

A particularly compact design may result if the carrier is constructed telescopically, at least in certain regions.

In one embodiment, the carrier has at least two supporting arms. A supporting arm can extend on either side of a bale to be cut. The cutter bar is accommodated between the supporting arms, so that a uniform distribution of forces results and the cutter bar can be guided uniformly in a simple manner.

In one aspect of the disclosure, the support or the support arms (in each case) has/have a support part and at least one further support part that is provided so as to be displaceable with respect to the support part via a guide. IN one aspect of the disclosure, the guide is designed in the manner of an elongated hole. In this manner, the supporting parts can in particular be telescopically retracted or extended, as a result of which a design that is as compact as possible can be achieved with a maximum extension of the carrier. Such a design is particularly favorable during transport of the bale-cutting device or when it is not in use.

The bale cutting device may include at least one cutter motor designed in particular in the manner of a double-acting hydraulic motor, by means of which the cutter bar, the carrier/the support arms and/or the support parts can be moved, in particular translationally, with respect to one another. The cutter motor may act on at least one of the support parts. The bale cutting device can be equipped with only one cutter motor. However, the bale cutting device may include additional cutter motors. For example, the exemplary embodiment of the cutting device shown in the Figures and described herein includes two cutter motors, in particular, associated with respective support arms and/or mounted thereon.

If at least one traction drive is provided that transmits a movement of the cutter motor to at least one support part and/or the cutter bar, this can contribute to moving the support parts and/or the cutter bar at least substantially synchronized and/or by means of only one cutter motor.

Optionally, a device for handling bales may be provided on the carrier, so that the bale cutting device can also be used for handling a bale. Such device may include at least one engagement position and one disengagement position, so that the device does not engage with the bale, for example, during cutting or severing of the bale by the bale cutting device. The handling device may be brought out of an engagement position into a disengagement position by the cutter bar or its movement. The handling device may be prestressed or biases in the direction of its engagement position, for example, spring-loaded.

The implement may include at least one pick-up that is equipped with such a bale cutting device, the bale cutting device may be pivotably received on the pick-up. The pickup can be a fork, a shovel, a gripper or any other suitable device, in particular for industrial as well as agricultural use. The implement is designed, in particular, in the form of an attachment or forms a component of such an attachment. It is conceivable to equip the implement with a bale cutting device at the factory or subsequently, to retrofit it or to provide a bale cutting device as an interchangeable implement. The implement may be configured for use on an industrial or, in particular, an agricultural vehicle. The vehicle can be, for example, a tractor, a loader, a telescopic loader or a similar working vehicle.

In a method for operating such an implement, the cutter bar of the bale cutting device is moved from a first position adjacent to the pivot axis into at least one further position spaced apart from the pivot axis, such as a maximum distance, and is subsequently brought up to the bale in such a way that the bale cutting device engages on or within the bale in order to cut the bale at least substantially in half.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic perspective side view of a support arm of the bale cutting device.

FIG. 3A is an enlarged schematic plan view of a portion of the support arm of the bale cutting device.

FIGS. 4A-4H are schematic perspective views showing the bale cutting device in different operational positions.

FIG. 5A is a schematic perspective view of the implement and the bale cutting device.

FIG. 5B is a schematic perspective view of the implement and the bale cutting device.

FIG. 6 is an enlarged schematic perspective view of the region I shown in FIG. 5B.

DETAILED DESCRIPTION

Those having ordinary skill in the art will recognize that terms such as "above," "below," "upward," "downward," "top," "bottom," etc., are used descriptively for the Figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
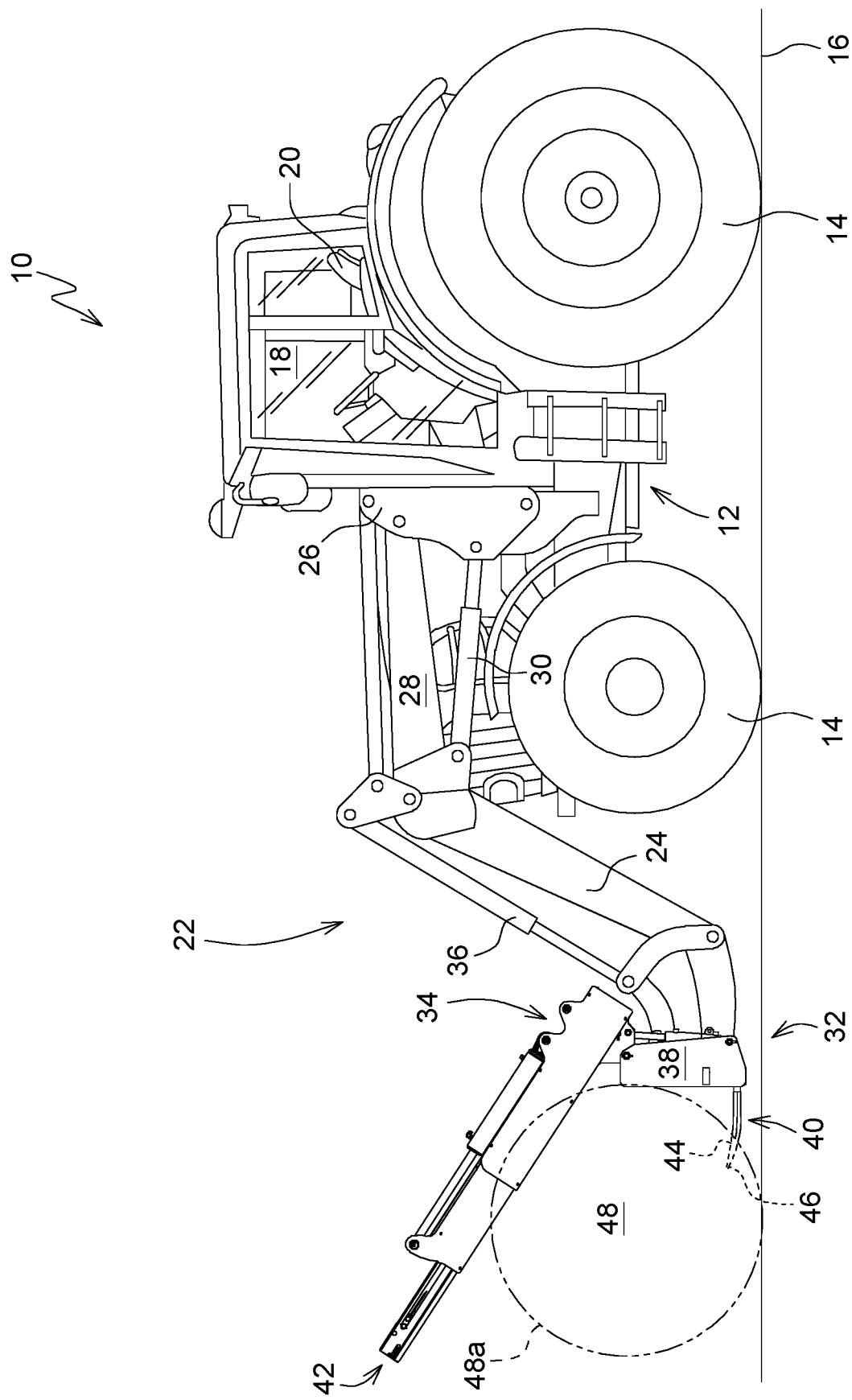
FIG. 1 is a schematic side view of an agricultural work vehicle including an implement having a bale cutting device.

Referring to the Figures, wherein like numerals indicate like parts throughout the several views, an agricultural working vehicle is generally shown at 10. Referring to FIG. 1, The agricultural working vehicle 10 is shown in the form of a tractor. The working vehicle 10 is self-propelled and has a frame 12 that is supported on the ground 16 via wheels 14. In addition, a cab 18 with an operator's seat 20 for an operator is provided on the working vehicle.

A loader device 22 in the form of a front loader is provided on the working vehicle. The loader device 22 comprises a loader arm 24 that can be mounted on both sides of the working vehicle 10, wherein the loader arm 24 according to the embodiment shown can be coupled to the working vehicle 10 by means of a mounting bracket 26 connected to the frame 12.

The loader arm 24 comprises support arms 28 running parallel on both sides of the working vehicle 10, which are connected to one another via a transverse strut (not shown), and can be pivoted via hydraulic lifting cylinders 30, which likewise extend on both sides of the working vehicle 10. At a free end 32 of the loader arm 24, an implement 34 is pivotably received by means of a hydraulic pivot cylinder 36.

The implement 34 has an attachment carrier 38 connectable to the loader arm 24, a pick-up 40 and a bale cutting device 42. According to the present embodiment, the pick-up 40 is designed in the manner of a fork 46 that has a plurality of prongs 44 extending at least substantially rigidly away from the attachment carrier 38 and which is suitable for picking up, handling and/or transporting a bale 48, in particular a cylindrical agricultural bale consisting of crop. However, the pick-up 40 can also be designed differently, for example, as a gripper or as a shovel, etc., and/or can be designed suitably to pick up and/or handle other material, such as bulk material, crop material, soil, etc., or bales of a different shape, such as cuboid bales or industrial bales.

Figure 2:
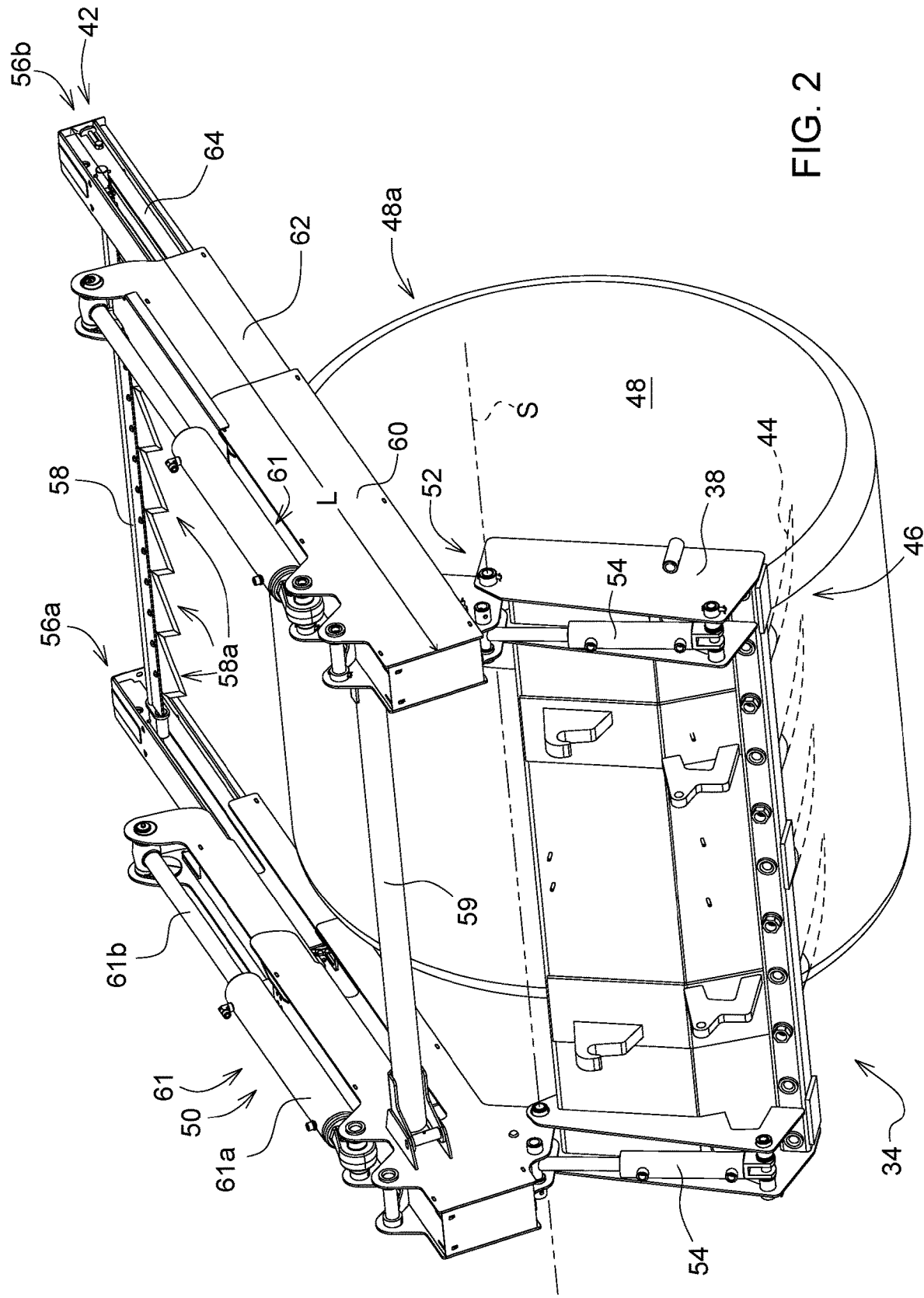
FIG. 2 is a schematic perspective view of the implement and the bale cutting device.

The reader is now referred to FIG. 2 of the drawing, in which the implement 34 is shown in a perspective representation. The bale cutting device 42 has a carrier 50, which is provided on the attachment carrier 38 so as to be pivotable about a pivot axis S via a joint 52 by means of a pivot motor 54 constructed in the manner of a double-acting hydraulic cylinder and extends away from the pivot axis S (longitudinal extent L).

The carrier 50 has a left and a right support arm 56a, 56b, between which a cutter bar 58 extends, which is equipped with a plurality of knives 58a (FIG. 3a). In a region facing the attachment support 38, a torsion tube 59 is provided, which connects the support arms 56a, 56b and is intended to contribute to the support arms 56a, 56b assuming the same angular position. In addition, a cutter motor 61, which is constructed in the manner of a double-acting hydraulic motor having a hydraulic cylinder 61a and a hydraulic piston 61b, is provided on each of the support arms 56a, 56b. The cutter motor 61 is also pressurized by a hydraulic source provided on the working vehicle 10 (see also FIGS. 7a and 7b).

According to the illustration in FIG. 3, the support arms 56a, 56b each have a first support part 60 connected to the joint 52 and a second and a third support part 62 and 64 provided displaceably with respect to the first support part 60. The second support part 62 is displaceably mounted on the first support part 60 via a guide 66 that is provided in the first support part 60 and is constructed in the manner of an elongated hole extending in a longitudinal extent L of the carrier 50. The third support part 64 is in turn displaceably mounted on the second support part 62 via a guide 68 that is provided in the second support part 66 and is likewise designed as an elongated hole. The cutter motor 61 engages at one end with the hydraulic cylinder 61a thereof on the first support part 60 and at the other end, via the hydraulic piston 61b, with a region 70 facing away from the add-on support 38, via a bracket 72 on the second support part 62.

A traction drive 74a, 74b is provided on each of the second and third support parts 62, 64. The traction drives 74a, 74b correspond in structure and mode of operation, for which reason their components are provided in the following with corresponding reference numerals. The traction drive 74a has two gearwheels 76a, 76b, which are spaced apart in the longitudinal extent of the carrier 50 and around which an endless drive means 78a, 78b, in the manner of a chain, loops. The drive means 78a is fixedly connected at a point 80a to the first support part 60 and, at a point 82a spaced apart from the first point 80a, to the third support part 64 in such a way that the third support part 64 is moved by the drive means 78a together with, or at least substantially synchronously with, the second support part 62 when the latter is moved by the cutter motor 61 with respect to the first support part 60.

The drive means 78b of the second traction drive 74b, in turn, is fixedly connected at a point 80b to the second support part 62 and, at a point 82b spaced from the point 80b, to the cutter bar 58, which is also slidably received in the guide 84 designed as an elongated hole, so that the cutter bar 58 is moved by the drive means 78b in the guide 84 substantially synchronously with the third support part 64 when the latter is moved by the drive means 78a with respect to the second support part 62.

In order to be able to compensate for length deviations between the support arms 56, it is advantageous if a connection 85 between the cutter bar 58 and the associated traction drive 74b allows a certain amount of play, for example by constructing the latter, as shown in FIG. 3a, in the manner of a ball-and-socket joint.

The reader is now also referred to FIGS. 4a to 4h of the drawing, in which the bale cutting device 42 is shown in different positions. According to FIG. 4a, the support parts 60, 62, 64 and the cutter bar 58 assume a retracted position A for receiving a bale 48, in which position the second support part 62, the third support part 64 and the cutter bar 58 are located in their respective guides 66, 68 and 84 in the position closest to the attachment carrier 38. When the bale 48 has been received by the prongs of the fork 46 (FIG. 4b), the cutter motor 61 moves the second support part 62 and, via the traction drives 74a and 74b, also the third support part 66 and the cutter bar 58 in their respective guides 66, 68 and 84 into their position B (FIG. 4c) facing away from the attachment carrier 38. According to the illustration in FIGS. 4c to 4e, the carrier 50 pivots by means of the drive 54 in such a way that the cutter bar 58 is brought into a distal position C (FIG. 4e) that is at least substantially opposite the pivot axis S with respect to the bale 48 or a bale center M (Shown in FIG. 4c). Subsequently, the cutter bar 58 in the guide 84 and the second and third support parts 62, 64 of the support arms 56 are moved by means of the cutter motor 61 in the longitudinal direction L toward the pivot axis S or the attachment carrier 38, so that the cutter bar 58 first cuts any wrapping material 48a that may be wrapping the bale and then divides the bale 48 at least substantially half.

Optionally, it can be provided that, in a position that may be arranged above a center M of the bale (see FIG. 4c), the cutter bar 58 is brought up to the bale 48 only in such a way that its knives 58a merely engage with the bale 48 or the wrapping material enveloping the bale 48, but do not sever it, as a result of which the bale 48 can be stabilized or secured by the bale cutting device 42, in particular for transport.

The reader is now also referred to FIGS. 5a and 5b, in which the bale cutting device 42 is shown equipped with an optional gripper 86. The gripping device 86 has a gripping bar 88 extending between the support arms 56a, 56b with approximately uniformly spaced prongs 90, which can assume a first position, shown in FIG. 5a, in which the prongs extend away from the support arms 56 in the direction of the bale 48 in such a way that they can engage with the bale 48, and a second position, shown in FIG. 5b, in which the prongs are aligned away from the bale 48 or substantially flush with the support arms 56 and in which they cannot engage with the bale 48.

For this purpose, as shown in FIG. 6, the gripping bar 88 is connected to the third support part 64 via a pivoting arm 92 in a prestressed manner in the direction of the gripping bar position shown in FIG. 5a in such a way that, as shown in FIG. 6, the gripping bar can be pivoted by the action of the cutter bar 58 into the position shown in FIG. 5b.

Figure 7A:
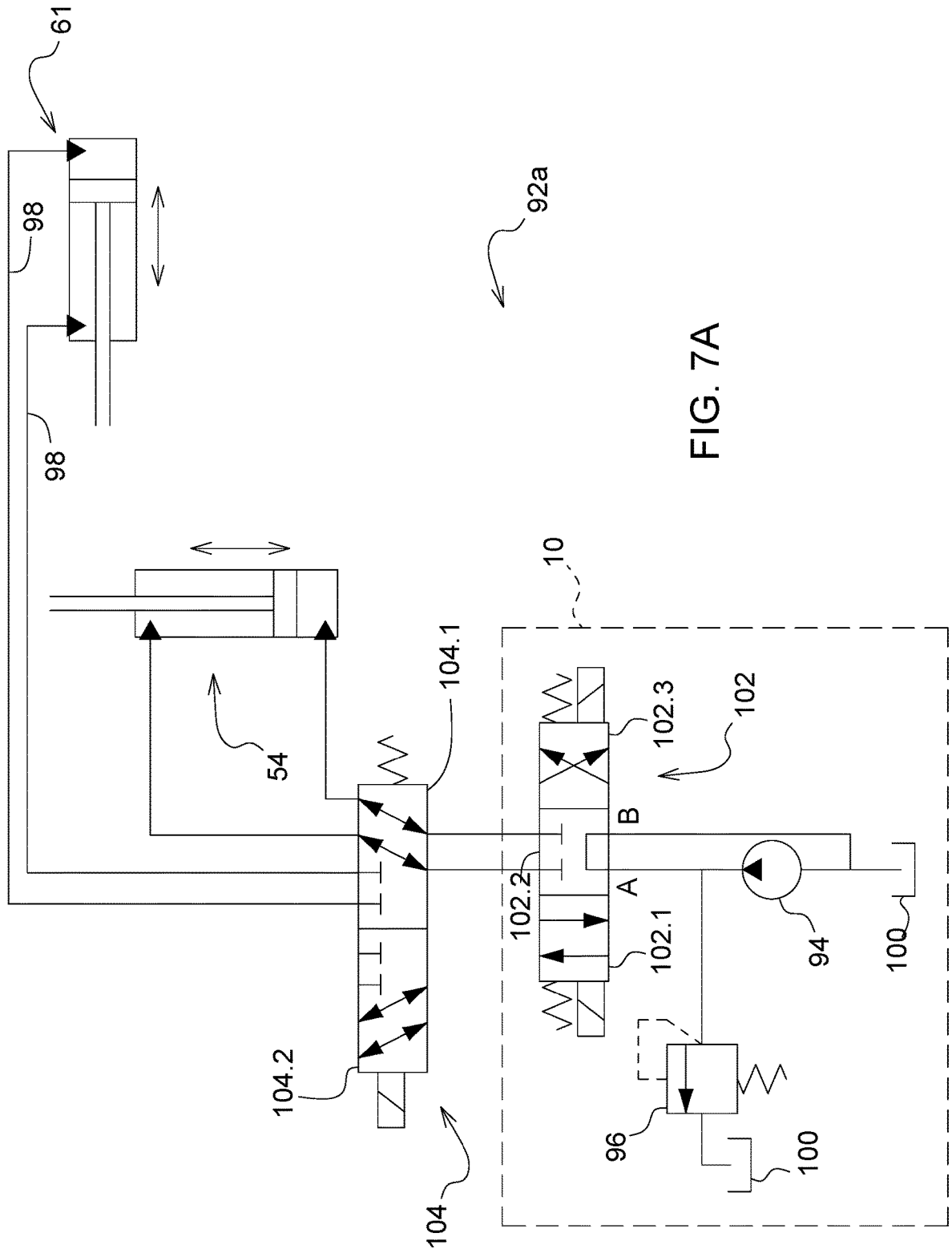
FIG. 7A is a first configuration of a hydraulic circuit for the implement.
Figure 7B:
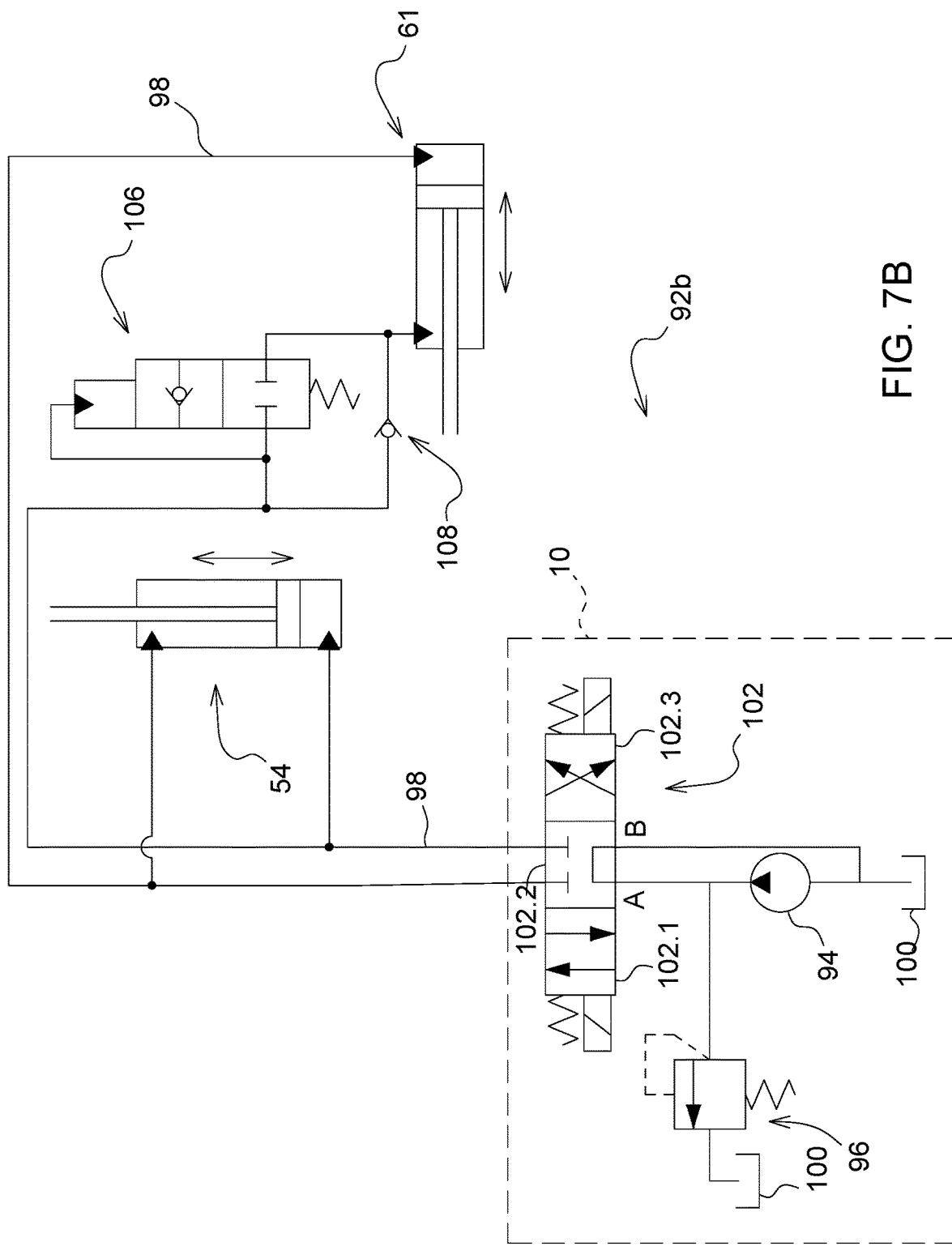
FIG. 7B is a second configuration of the hydraulic circuit for the implement.

FIGS. 7a and 7b show two hydraulic circuits 92a, 92b that are suitable for controlling the pivot motor 54 and the cutter motor 61 in accordance with the method shown in FIGS. 4a to 4h, corresponding components in the Figures being designated below by the same reference numerals.

According to the representation in FIGS. 5a and 5b, the respective hydraulic circuit 92a is pressurized by a pressure source 94 provided on the working vehicle 10, a pressure relief valve 96 being provided in the usual manner, via which hydraulic medium can flow off into a reservoir 100 if a pressure in the lines 98 exceeds limit pressure. Furthermore, a control valve 102, which is designed in the manner of a 4/3-way valve and can assume positions 102.1, 102.2 and 102.3, is provided on the working vehicle 10, which control valve has outputs A and B that can be selectively pressurized in accordance with the respective position of the control valve 102. If the implement 34 is not operative, then the control valve 102 assumes its neutral position 102.2, in which none of the connections A, B is acted upon by pressure.

According to the embodiment shown in FIG. 7a, the control valve 102 is upstream of a changeover valve 104, which is constructed in the manner of a 6/2-way valve and can assume positions 104.1 and 104.2, and which makes it possible, depending on the position thereof, to apply pressure selectively either to the pivoting motor 54 or to the cutter motor 61. In order to pivot the support arms 56 upward, the control valve 102 assumes its position 102.1, in which hydraulic pressure is applied to the outlet A. The changeover valve 104 assumes its position 104.1. In order to pivot the support arms 56 downward, the control valve 102 assumes its position 102.3, in which hydraulic pressure is applied to the outlet B. If the carrier 50 is to be extended or the cutter bar 58 is to be brought into its position B or C, the changeover valve 104 is brought into its corresponding position 104.2, while the control valve 102 remains in its position 102.1. In order to sever the bale 48, the control valve 102 is brought into its position 102.3 while the changeover valve 104 is in its position 104.2. The control valve 102 and the changeover valve 104 can be actuated here substantially by an operator via corresponding control elements, for example, arranged in the cab 18 but not shown, such as a joystick and/or corresponding switching elements. However, a (semi) automatic control, for example by means of a regulating or control device (likewise not shown), in particular a regulating or control device of the work vehicle 10, is also conceivable.

The reader is now referred to FIG. 7b illustrating an alternatively configured hydraulic circuit 92b. The latter likewise has a pressure source 94 that applies pressure to a control valve 102. In this case, however, no changeover valve is arranged downstream of the control valve 102, but rather the pivoting motor 54 and the cutter motor 61 are connected in parallel, a sequence valve 106, in the manner of a pressure follower valve, and a non-return valve 108 being connected upstream of the cutter motor 61 in such a way that the cutter motor 61 retracts in order to move the cutter bar 58 in the direction of the bale 48 when the control valve 102 is in its position 102.3, and a corresponding pressure is present in the lines 98, which opens the sequence valve 106, because, for example, the carrier 50 comes to rest against a travel limiter (not shown).

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A bale cutting device comprising:
   a left support arm and a right support arm each extending along a longitudinal extent and coupled together in a spaced parallel relationship, with each of the left support arm and the right support arm including a respective first support part and a respective second support part, with the second support part supported by and telescopically moveable relative to the first support part;
a double-acting hydraulic cylinder interconnecting the respective first support part and the respective second support part of one of the left support arm or the right support arm for moving the respective second support part relative to the respective first support part;
wherein each of the left support arm and the right support arm include a respective third support part, with the respective third support part supported by and telescopically moveable relative to the respective second support part of each of the left support arm and the right support arm;
a traction drive interconnecting the respective second support part and the respective third support part of one of the left support arm or the right support arm and operable to move the respective third support part along the longitudinal extent in response to movement of the double-acting hydraulic cylinder;
a cutter bar attached to and extending between each of the left support arm and the right support arm, wherein the cutter bar is moveable relative to the respective first support part of the left support arm and the respective first support part of the right support arm along the longitudinal extent between a retracted position and a distal position; and
wherein the cutter bar includes a plurality of knives.

2. The bale cutting device set forth in claim 1, further comprising a gripping device attached to and extending between the left support arm and the right support arm and rotatable about an axis extending transverse to the longitudinal extent between an engagement position and a disengagement position.

3. An Implement for an agricultural vehicle, the implement comprising:
an attachment carrier configured for attachment to the agricultural vehicle;
a left support arm and a right support arm coupled together in a spaced parallel relationship, wherein each of the left support arm and the right support arm is rotatably connected to the attachment carrier for pivotable movement about a pivot axis relative to the attachment carrier and extend from the pivot axis along a longitudinal extent, with each of the left support arm and the right support arm including a respective first support part and a respective second support part, with the second support part supported by and telescopically moveable relative to the first support part;
a hydraulic cylinder interconnecting the respective first support part and the respective second support part of one of the left support arm or the right support arm for moving the respective second support part relative to the respective first support part along the longitudinal extend;
wherein each of the left support arm and the right support arm includes a respective third support part, with the respective third support part supported by and telescopically moveable relative to the respective second support part of each of the left support arm and the right support arm;
a traction drive interconnecting the respective second support part and the respective third support part of one of the left support arm or the right support arm and operable to move the respective third support part along the longitudinal extent in response to movement of the hydraulic cylinder;
a cutter bar attached to both the left support arm and the right support arm for movement relative to the carrier attachment along the longitudinal extent between a retracted position and a distal position; and
wherein the cutter bar includes a plurality of knives.

4. The implement set forth in claim 3, wherein the hydraulic cylinder is a double-acting hydraulic cylinder.

5. The implement set forth in claim 3, further comprising a gripping device attached to and extending between the left support arm and the right support arm and rotatable about an axis extending transverse to the longitudinal extent of the carrier.

6. The implement set forth in claim 3, wherein the cutter bar is moveable relative to the respective first support part of the left support arm and the respective first support part of the right support arm along the longitudinal extent of the carrier.

7. The implement set forth in claim 3, wherein the cutter bar is rotatably attached to the third support part of the left support arm and the third support part of the right support arm.

* * * * *